Figure 1:
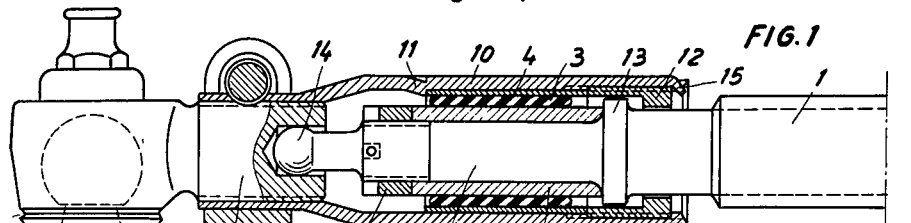

July 31, 1956  J. LATZEN  2,757,028
STEERING RODS FOR MOTOR VEHICLES
Filed Aug. 15, 1950

INVENTOR
JOSEF LATZEN
BY Robert H. Jacob
AGENT

United States Patent Office 2,757,028
Patented July 31, 1956

2,757,028

STEERING RODS FOR MOTOR VEHICLES

Josef Latzen, Dusseldorf-Oberkassel, Germany, assignor to A. Ehrenreich & Cie, Dusseldorf-Oberkassel, Germany, a firm Application August 15, 1950, Serial No. 179,538
In Germany December 30, 1948

Public Law 619, August 23, 1954
Patent expires December 30, 1968

4 Claims. (Cl. 287—85)

My invention relates to an improved system of steering rods for motor vehicles wherein the steering rods are connected by a rubber sleeve arranged between and adhering to overlapping cylindrical surfaces.

Object of the present invention is to provide a system of steering rods which reduces the wear of the whole steering gear and which improves the driving qualities of vehicles.

Steering rods of the aforesaid design are already well-known where the track rod consists of two overlapping tubes and a rubber sleeve arranged between and adhering to the said tubes which sleeve extends over the overlapping length of the tubes. Either tube is connected with a steering rod. For avoiding an excessive extension or shortening of the track rod stops restricting any axial displacement of the tubes against one another are provided. A rubber sleeve of such a length should be capable to yield a certain axial flexibility. This construction of the track rod, it is true, prevents the axial transmission of short axial shocks or vibrations from one tube to the other one, thus utilizing the shock absorbing effect of the rubber sleeve when strained by shear, i. e. by axial strains. The shocks starting from the steering wheels, however, are not kept away from the steering rod as the latter is connected with the external tube thus being strained by those shocks. It is also disadvantageous for the vibration damping of the whole car that the shocks act upon comparatively long parts or big masses.

According to the present invention a track rod is connected with joint rods by an armoured rubber sleeve forming a connecting body an external cylindrical socket of which engages, by means of a connecting member, one part to be connected and an internal cylindrical socket engages the other one, wherein the rubber sleeve has small length in comparison with the track rod. This design attains that short shocks as well as wheel vibrations are already absorbed before their extending to parts of the steering rods, thus improving the driving qualities of the car. The invention is not restricted to a certain design of the steering rods. The system of rods, for instance, may be a track rod or a combination of rods connecting a steering lever with steering bolts.

As to the overlapping part of the connecting member the faces engaging the external socket may be formed by inward projections or by inwardly rolled beads. In a similar manner stops for stopping any axial displacement may be provided in the overlapping part of the connecting member. It is also possible to provide a threaded connection between the external socket and the overlapping part of the connecting member.

Figure 2:
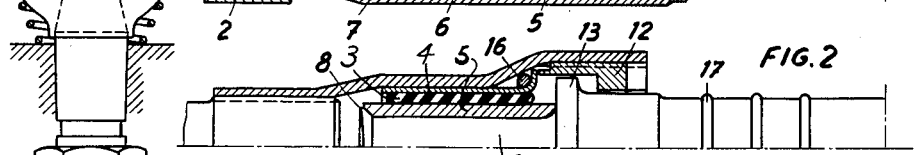
Figure 3:
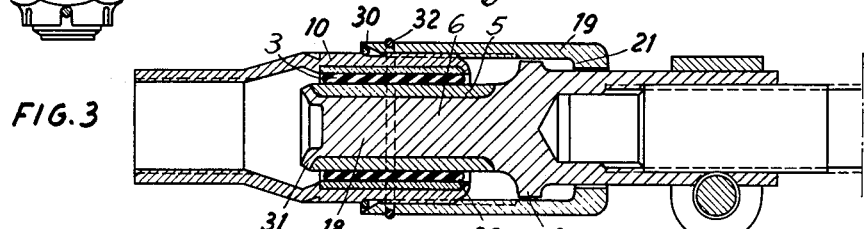
Figure 4:
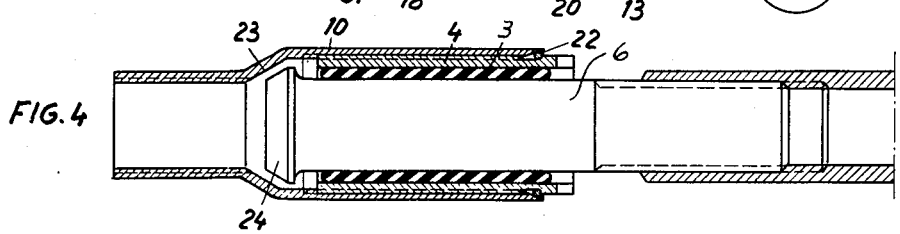
Figure 5:
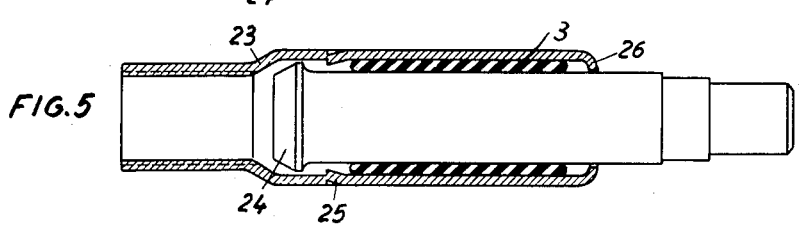
Figure 6:
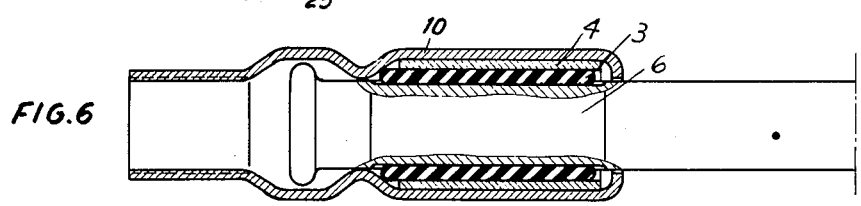
Figure 7:
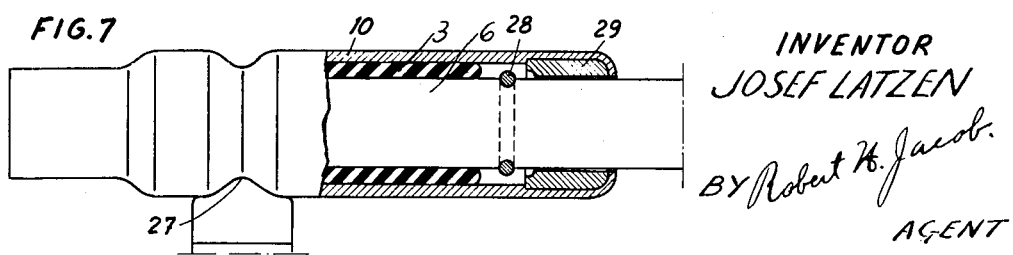

By way of example, some preferred embodiments of the present invention are shown in the accompanying drawings in longitudinal section, wherein Fig. 1 is a first embodiment;
Fig. 2 is another embodiment, shown one half only;
Fig. 3 shows an embodiment wherein the connection is made by a cap nut;
Figs. 4 and 5 illustrate two other embodiments, and
Figs. 6 and 7 illustrate two embodiments provided with stops formed by inwardly rolled beads.

Similar letters refer to similar parts throughout the several views.

Referring now to Fig. 1 a track rod 1 is connected with a joint rod 2 by a rubber sleeve 3 armoured by both a metallic outer sleeve 4 and a metallic inner sleeve 5. A rigid connection of the rubber sleeve 3 with the sleeves 4 and 5 may be attained, for instance, by subsequent vulcanizing. The connecting body formed by the sleeves 4 and 5 fits upon a guide rod 6. The inner sleeve 5 is secured to the guide rod 6 by a threaded ring 7. A connecting sleeve 10 forming the connection with the joint rod 2 encloses the aforesaid connecting body. A projection 11 engages the joint rod end of the outer sleeve 4, whereas the other end is secured by a threaded stop ring 12. The inner side of this ring 12 together with a collar 13 stops the axial displacement in one direction, whereas the axial displacement in the other direction is limited by a ball head 14 of the guide rod 6 pushing against the joint rod 2. Unintentional loosening of the threaded stop ring 12 is avoided by a beaded portion 15.

With reference to the modification shown in Fig. 2 the outer sleeve 5 is secured to the guide rod 6 by means of a riveting connection 8. The axial displacement is limited by the collar 13, the threaded stop ring 12 securely fastened to connecting sleeve 10 and by a flared portion of the outer sleeve 4 supported by a wire core 16. The guide rods 6 are provided with beads 17 to permit pulling over the tube forming a track rod.

Referring now to the modification shown in Fig. 3 the shock absorbing body is secured to the guide rod 6 by means of a bolt 18 threaded to the guide rod 6. The connection with the connecting sleeve 10 is effected by a cap nut 19 being screwed against a wire core 30 and secured by a hook ring 32. The face of the rod 6 is provided with a borehole the border 31 of which is beaded in order to secure the outer sleeve 5. The axial displacement is restricted by the collar 13, a beaded edge 20 of the connecting sleeve 10, and an inner shoulder 21 of the cap nut 19.

Referring now to Fig. 4 it will be seen that the modification according to the upper half of the Fig. 4 is not provided with an internal sleeve and that moreover in the modification according to the lower half of the Fig. 4 the outer sleeve is also absent. According to the modification shown in the upper half of Fig. 4 the connecting sleeve 10 is screwed on the outer sleeve 4 over a wire core 22. The axial displacement in one direction is limited by a tapered face 23 of the connecting sleeve 10 bearing against a rod collar 24. As to the modification shown in the upper half of Fig. 4 the shoulder of the outer sleeve 4 stops the axial displacement in the other direction, whereas, for the same purpose, in the modification shown in the lower half of Fig. 4 three or more inward projections 25 are provided. An end 26 of the connecting member 10 is beaded towards the guide rod 6. The rod end is reduced in steps to several different diameters in order to enable the screwing on of rod tubes of different diameters.

Inner sleeves are likewise missing in the two modifications shown in Fig. 5. The outer sleeve is missing in the modification shown in the lower half of Fig. 5. Instead of the inward projections 25 an inwardly rolled groove 27 is provided. According to the modification shown in the upper half of Fig. 5 the outer sleeve 4 is arranged within the connecting sleeve 10 and the rubber sleeve 3 is mounted upon a shoulder of the rod 6, whereas in the modification shown in the lower half of the Fig. 5 the rubber sleeve 3 is connected with both the guide rod 6 and the connecting member 10 by vulcanizing. Stops are formed by a spring ring 28 and a guide socket 29.

Various other structural modifications and changes may be made in steering rods for motor vehicles redesigned as shown and described, without departing from the spirit and the salient ideas of this invention.

What I claim is:

1. Steering mechanism including an axially movable thrust rod, a joint rod having a socket in telescoping engagement with and movable axially relative to said thrust rod, a shock absorbing device comprising a cylindrical rubber sleeve mounted within said socket and held firmly with its inner cylindrical surface in fixed position relative to said thrust rod and with its outer cylindrical surface in fixed position relative to said socket, and rigid abutment means disposed within said socket and defined by an enlarged portion of said rod and by a conformation extending inwardly of said sleeve, whereby small vibrations in axial direction are absorbed in said rubber sleeve, while major axial thrusts are opposed by said abutment means.

2. Steering mechanism including an axially movable thrust rod, a joint rod having a socket in telescoping engagement with and movable axially relative to said thrust rod, a shock absorbing device comprising a cylindrical rubber sleeve mounted within said socket and held firmly with its inner cylindrical surface in fixed position relative to said thrust rod and with its outer cylindrical surface in fixed position relative to said socket, rigid abutment means disposed within said socket and defined by an enlarged portion of said rod and by a conformation extending inwardly of said sleeve, and a metallic sleeve secured to said socket in fixed position and around said rubber sleeve, whereby small vibrations in axial direction are absorbed in said rubber sleeve, while major axial thrusts are opposed by said abutment means.

3. Steering mechanism including an axially movable thrust rod, a joint rod having a socket in telescoping engagement with and movable axially relative to said thrust rod, a shock absorbing device comprising a cylindrical rubber sleeve mounted within said socket and held firmly with its inner cylindrical surface in fixed position relative to said thrust rod and with its outer cylindrical surface in fixed position relative to said socket, rigid abutment means disposed within said socket and defined by an enlarged portion of said rod and by a conformation extending inwardly of said sleeve, a metallic sleeve secured to said socket in fixed position and around said rubber sleeve, and a metallic sleeve secured upon said thrust rod with its outer cylindrical surface in engagement with the inner cylindrical surface of said rubber sleeve, whereby small vibrations in axial directions are absorbed in said rubber sleeve, while major axial thrusts are opposed by said abutment means.

4. Steering mechanism including an axially movable thrust rod, a joint rod having a socket in telescoping engagement with and movable axially relative to said thrust rod, a shock absorbing device comprising a cylindrical rubber sleeve mounted within said socket and held firmly with its inner cylindrical surface in fixed position relative to said thrust rod and with its outer cylindrical surface in fixed position relative to said socket, and rigid abutment means presenting abutment surfaces in both directions of axial movement disposed within said socket and defined by an enlarged portion of said thrust rod and by conformations extending inwardly of said sleeve, whereby small vibrations in axial direction are absorbed in said rubber sleeve, while major axial thrusts are opposed by said abutment means.

References Cited in the file of this patent

UNITED STATES PATENTS

| 1,786,717 | Moore et al. | Dec. 30, 1930 |
| 1,786,718 | Moore et al. | Dec. 30, 1930 |
| 1,827,234 | Hughes | Oct. 13, 1931 |
| 1,930,067 | Tibbetts | Oct. 10, 1933 |
| 1,939,444 | Geyer | Dec. 12, 1933 |
| 1,993,260 | Burns | Mar. 5, 1935 |
| 2,351,427 | Henshaw | June 13, 1944 |

FOREIGN PATENTS

| 122,573 | Austria | Apr. 25, 1931 |
| 565,330 | Germany | Nov. 29, 1932 |